Sept. 14, 1937.   P. C. RODGERS   2,093,291
SEALING MEANS FOR THE PISTON OF A GASHOLDER
Filed May 28, 1936   2 Sheets-Sheet 2
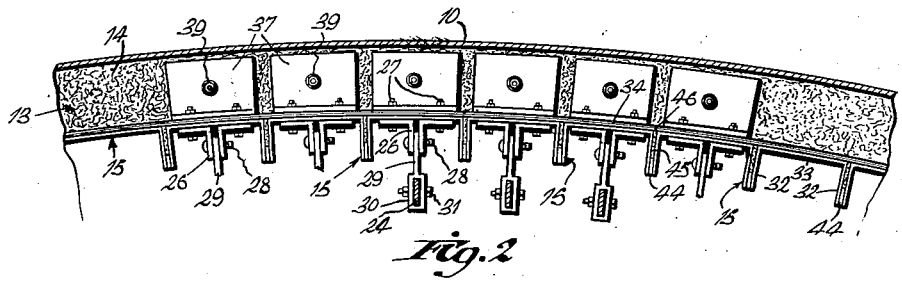
Fig. 2
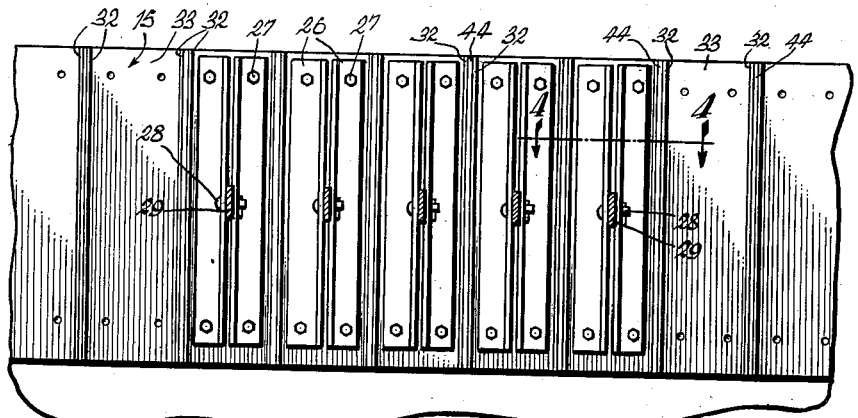
Fig. 3
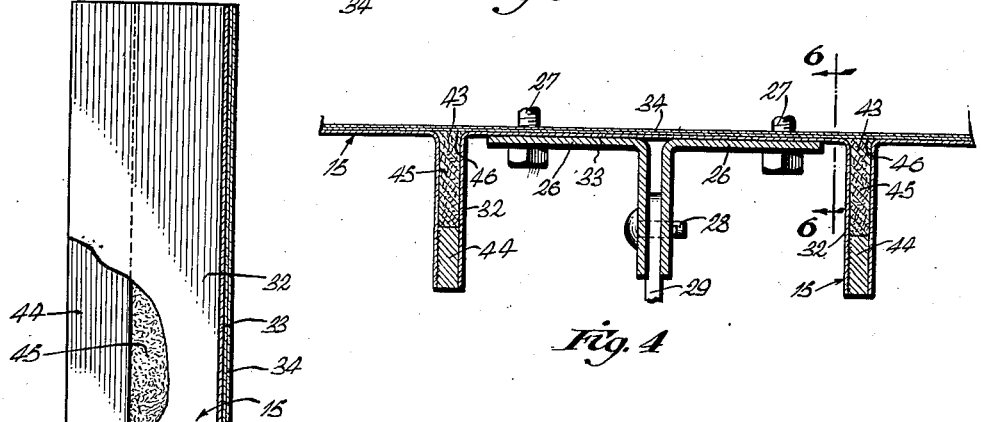
Fig. 4
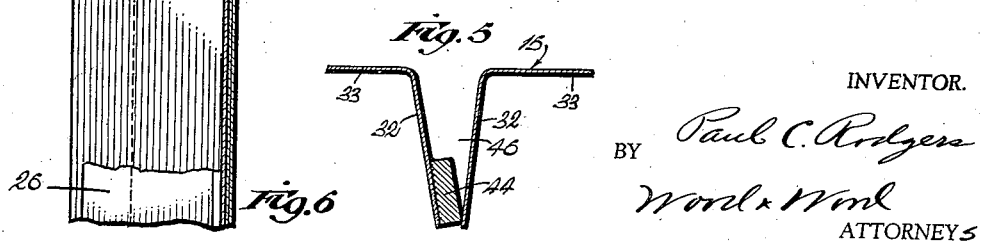
Fig. 5
Fig. 6
INVENTOR.
Paul C. Rodgers
BY
Wood & Wood
ATTORNEYS Patented Sept. 14, 1937

2,093,291

UNITED STATES PATENT OFFICE 2,093,291

SEALING MEANS FOR THE PISTON OF A GASHOLDER

Paul C. Rodgers, Glendale, Ohio, assignor to The Stacey Bros. Gas Construction Company, Cincinnati, Ohio, a corporation of Ohio Application May 28, 1936, Serial No. 82,296

2 Claims. (Cl. 48—176)

This invention relates to storage reservoirs or holders for gas or the like. It is particularly directed to improvements in the vertically translatable piston or deck within the reservoir, which functions as a movable top closure for the gas contained in the holder. The gas is confined in the space between the piston and the closed base of the holder, which piston by its weight maintains the gas under pressure, and vertically adjusts to accommodate the gas supply contained in the reservoir. This type of gas holder is commercially known as a waterless gas holder.

The piston incorporates a solid or mechanical seal for sealing the piston with the wall of the reservoir. The seal includes an arrangement of one or several packing rings placed on a dilatable sheet metal ring, and constantly bearing, under pressure, against the wall of the holder under the influence of levers and weights.

The sheet metal ring has been made dilatable by incorporating vertically disposed flutes or ribs therein. These flutes have been designed to permit the ring to dilate, either in contractive or expansive movement and to bend to any irregular contour necessary for maintaining the mechanical seal or packing ring in uniform and positive contact with the wall of the holder throughout the entire inner circumference thereof. The ring, thus provided, has been a continuous structure and although it has been dilatable up to certain points, limitations have been enforced due to the use of a continuous structure.

It is the object of this invention to provide a seal for the piston of a gas holder which has increased flexibility or elasticity and wherein there are no restrictions on the ability of the packing rings to adjust to the contour of the holder wall, other than those imposed by the packing rings themselves. That is to say, the present invention provides a seal in which the supporting means places no limitations on the movement of the seal rings in their function of providing absolute contact with the holder wall. For this purpose the present invention involves the provision of a sealing ring support means made up of sections between which there are no rigid connections which will interfere in any way with the action of the independent supports of the sections.

It is another phase of the present concept that each section is independently supported. This structure brings about the result that the ring may flex in relation to small portions of the circumference, such as over the space of one or two sections. The improved seal ring, generally speaking, provides independent sections which may move directly radially, as well as stretch and contract circumferentially. A packing closely fitted to the holder wall is always insured.

Unlimited flexibility of the packing rings, that is, flexibility unhindered by the supporting means, is the ideal condition. The present invention accomplishes this. An extremely important result is that less contact maintaining power is necessary inasmuch as there is no tendency for any given section to interfere with the movement of the sections adjacent thereto.

It is a further object to provide a dilatable ring assembly of the foregoing nature, in which the support of the packing rings and the fabric seal ring is continuous, despite the arrangement of sections which are not interconnected.

The invention described and claimed herein is in the nature of an improvement on the invention disclosed and claimed in the application of Raphael B. Luebbe, Serial No. 82,571, filed May 29, 1936 and entitled "Sealing means for the piston of a gas holder".

Other objects and further advantages will be more fully apparent from the description of the accompanying drawings, in which:

Figure 2 is a fragmentary sectional view taken on line 2—2, Fig. 1, illustrating a portion of the circumference of the improved dilatable seal ring, certain of the weight elements being omitted.

Figure 3 is a fragmentary sectional view taken on line 3—3, Fig. 1, illustrating the internal appearance of the ring, certain of the weight elements being omitted.

Figure 4 is a fragmentary sectional view taken on line 4—4, Fig. 3, showing the relationship of the sections of the ring.

Figure 5 is a fragmentary horizontal sectional view taken similar to Figure 4, but showing the positions of the plate arms prior to assembly, whereby each section when assembled maintains contact with adjacent sections under considerable pressure.

Figure 6 is a fragmentary sectional view taken on line 6—6, Fig. 4, a portion of the view being broken away for exposing the abutting relationship of the sections.

Figure 1:
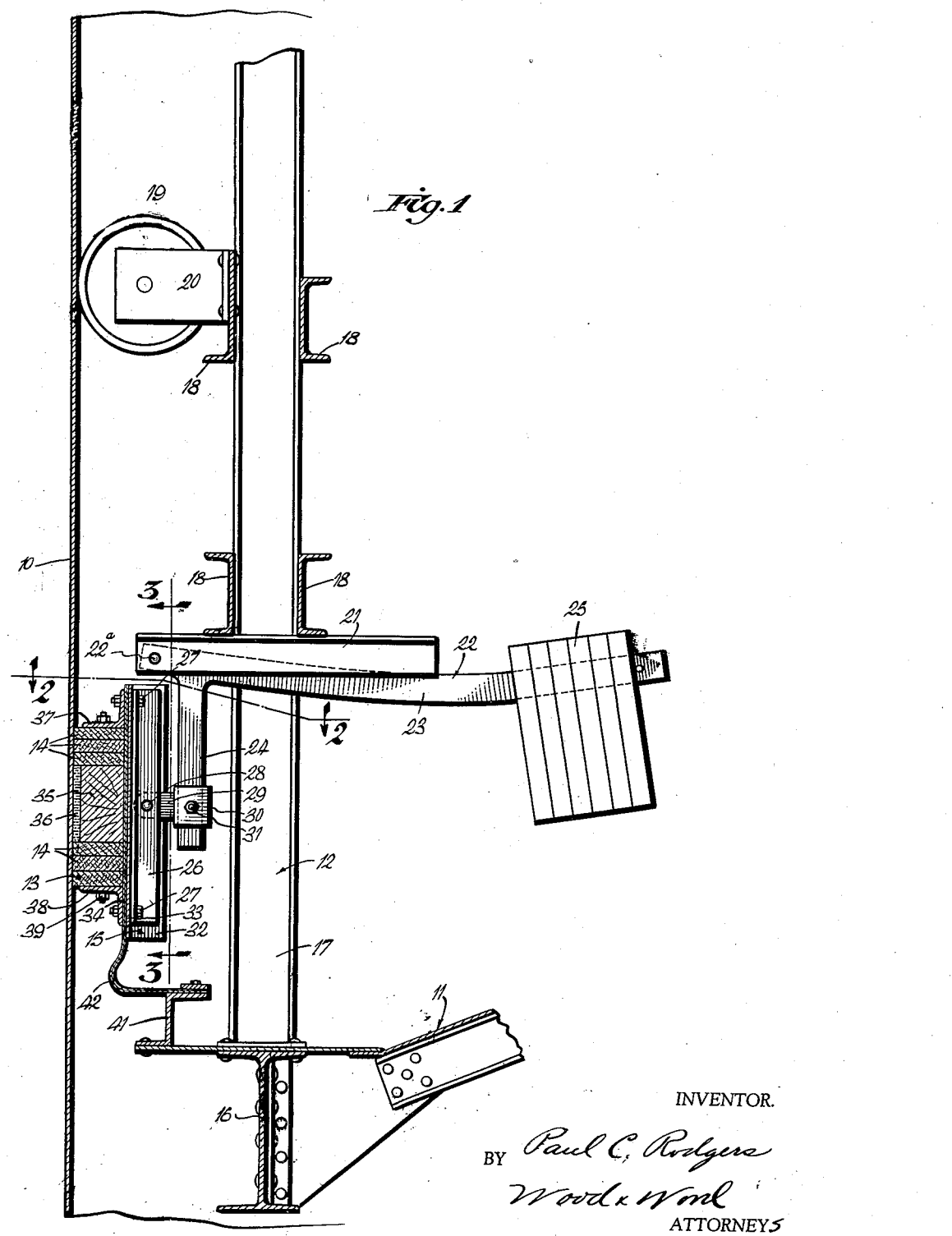
Figure 1 is a fragmentary sectional view taken through one side of a holder, illustrating a portion of the piston and showing the packing rings and support therefor, relative to the piston and the cylinder wall.

In the illustration of the invention herein, the packing or sealing rings are supported by means of a series of circumferentially arranged sections, each of which sections is mounted on a weighted lever and is acted upon by the weight for the purpose of independently functioning in the common purpose of providing absolute sealing contact of the rings with the holder wall.

Referring to the drawings, the wall of the seal or holder is indicated at 10 and the deck or piston, generally at 11. A superstructure, generally indicated at 12, is provided as a part of the outer edge structure of the piston. This superstructure carries the sealing unit, generally shown at 13. The sealing unit is fabricated of sealing rings 14 and the support sections 15. It is not believed necessary to describe the structure of the piston and its superstructure in detail. This is only described to that extent believed necessary to set forth the mounting and environment of the sealing unit of this invention.

The piston proper may be stated to comprise a fabricated structure on which plates are mounted to make up a cup-shaped piston. The margin of the piston incorporates I-beams 16 which may be described as circumferentially arranged. A series of I-beams 17 rise above and are supported on these I-beams 16. These vertical I-beams are braced relative to the piston or deck by means of angle iron brace elements extending to the top of the piston (not shown).

The uprights 12 are joined by angle iron and channel iron elements 18. The uprights 17 and cross elements 18 form a vertical frame structure which supports a plurality of rollers 19 mounted on brackets 20, attached to the vertical frame structure. The rollers 19 engage the inner wall of the shell and form the guiding means for the piston, more specifically, the means for preventing tilting of the piston.

The sealing unit 13 may be referred to as supported on the outer ends of angle iron elements 21. The elements 21 are extended radially and are attached to the under sides of cross beams 18. The seal ring 13 is hung from these rails or angle iron elements 21 by means of a plurality of levers 22. Each lever 22 is of bell crank form, providing arms 23 and 24. The arm 23 extends horizontally and carries a plurality of weights 25 on its outer end. The pivot 22ᵃ for the lever is located at the juncture of the arms thereof and through the outer end of the rail 21. The other arm 24 extends downwardly and is connected to a respective section 15 of the dilatable ring. It will be understood, of course, that there are a multiplicity of these levers or sections distributed around the piston structure, whereby the sealing unit is supported at closely spaced intervals and the ring is uniformly pressed outwardly against the cylinder wall.

The arm 24 of each lever 22 is secured to the respective section by a pivotal and adjustable connection. Angle iron brackets 26 are properly bolted to the seal ring unit by bolts 27. The ends of the arms 24 fit between the adjacent arms of the pivot brackets and are traversed by a pivot pin 28 in each instance. For purposes of adjustment, the arm 24 is sectional.

The section 29, which attaches to the pivot bracket, includes a sleeve portion 30 traversed by the main portion of the arm 24 which is disposed at right angles to the section 29. A bolt 31 fixes the sleeve portion to the arm 24. The position of the arm sections may be varied, depending on the position required for the weights. For example, if the weights are disposed at an unduly low elevation when the sealing unit is in snug engagement with the holder wall, the weight arm can be lifted without interfering with the position of the seal ring after loosening the bolt 31.

Describing one of the sections 15 in detail, it will be found, upon reference to the drawings, to consist of sheet metal of channel form, providing side arms 32 and a base wall 33. The channel elements are disposed vertically with the arms projecting substantially radially toward the center of the piston, the base wall lying against the fabric seal ring 34 disposed circumferentially of the holder.

The seal rings 14 are in sets, upper and lower, spaced by means of a wooden ring 35. The seal rings 14 are formed for continuous engagement with the inner wall of the holder shell. The spacer ring 35 is formed on a lesser diameter than the seal rings so as to provide a space 36 for grease or a lubricant of some sort adapted to saturate the seal or packing rings for maintaining the same in a pliant condition.

Upper and lower angle irons 37 and 38 respectively extend circumferentially and are held together by draw bolts 39, clamping the packing rings 14 and the spacer ring 35 between the angle iron elements 37 and 38. Each section 15 is secured to the angle iron pieces 37, 38, by the bolts 27, the fabric seal ring being interposed between the assembly of seal rings and the sections, and depending therefrom for attachment to a circumferentially arranged anchorage rail 41. Attachment of the fabric seal ring to the rail 41 is arranged so as to provide fullness in the fabric seal ring as indicated at 42.

The circumferential width and position of each section is such as to provide spaces between adjacent sections, as indicated at 43 (see Figure 4). A spacer bar 44 is attached to the outer edge margin of one arm of each section by welding or any other suitable means. The outer face of the spacer bar 44 has a sliding contact with the adjacent arm of the next section.

In order to provide contact under pressure, the arms 32, 32, are bent so as to project at greater than right angles to the inner wall of the section, as shown in Figure 5. When installed, they assume positions substantially at right angles with respect to the base walls of the sections. Any tendency to spread apart under the pressure of the packing 45 disposed between the arms is eliminated. The packing 45 provides support for the fabric seal ring at the gap between the sections, as indicated at 46.

Through the medium of these entirely independent free floating sections, maximum flexibility is achieved. Each weighted lever and section functions independently of the adjacent levers and sections, and performs the function of pressing its particular portion of the packing rings against the holder wall without restraint. The sliding contact between the sections does not interfere with this action. It is only provided for the purpose of providing a support for the packing between the sections, which supports the fabric seal ring.

Having described my invention, I claim:

1. In a reservoir for the storage of gas or the like, a piston, a packing ring for said piston, U-shaped support plates for said packing ring, said plates disposed around the inner periphery of said packing ring with the arms thereof extended inwardly and arranged in parallelism with the axis of the piston, the arms of adjacent plates spaced apart, and one of the adjacent arms including a rubbing bar fixed thereto in sliding contact with the adjacent arm and providing a cross surface between the arms, and packing in the space between the adjacent sections lying against the cross surface for supporting the portion of the packing ring spanning the space between the arms.

2. In a reservoir for the storage of gas or the like, a piston, a packing ring for said piston, U-shaped support plates for said packing ring, said plates disposed around the inner periphery of said packing ring with the arms thereof extended inwardly and arranged longitudinally with respect to the axis of the piston, the arms of adjacent plates spaced apart, and one of the adjacent arms including a rubbing bar fixed thereto in sliding contact with the other of the adjacent arms.

PAUL C. RODGERS.